United States Patent
Ramachandra et al.

(10) Patent No.: US 12,199,767 B2
(45) Date of Patent: Jan. 14, 2025

(54) PACKET DUPLICATION INDICATION FOR MDT

(71) Applicant: Telefonaktiebolaget LM Ericsson (publ), Stockholm (SE)

(72) Inventors: Pradeepa Ramachandra, Linköping (SE); Angelo Centonza, Torrenueva Costa Granada (ES); Sofia Svedevall, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 17/792,423

(22) PCT Filed: Jan. 21, 2021

(86) PCT No.: PCT/SE2021/050035
§ 371 (c)(1),
(2) Date: Jul. 13, 2022

(87) PCT Pub. No.: WO2021/162600
PCT Pub. Date: Aug. 19, 2021

(65) Prior Publication Data
US 2023/0039192 A1     Feb. 9, 2023

Related U.S. Application Data

(60) Provisional application No. 62/976,267, filed on Feb. 13, 2020.

(51) Int. Cl.
*H04W 24/10* (2009.01)
*H04L 1/08* (2006.01)
*H04W 76/15* (2018.01)

(52) U.S. Cl.
CPC ............... *H04L 1/08* (2013.01); *H04W 24/10* (2013.01); *H04W 76/15* (2018.02)

(58) Field of Classification Search
CPC .......... H04L 1/08; H04W 24/10; H04W 76/15
(Continued)

(56) References Cited

U.S. PATENT DOCUMENTS

2021/0037595 A1    2/2021    Jin et al.

FOREIGN PATENT DOCUMENTS

EP          3606274 A1     2/2020
WO       2019160327 A1     8/2019

OTHER PUBLICATIONS

International Search Report and Written Opinion of the International Searching Authority for PCT International Application No. PCT/SE2021/050035 dated Apr. 30, 2021.
(Continued)

*Primary Examiner* — Mark G. Pannell
(74) *Attorney, Agent, or Firm* — Sage Patent Group

(57) ABSTRACT

A method of operating a radio access network (RAN) node includes determining whether packet duplication is activated for a split data radio bearer (DRB), associated to a user equipment (UE) and initiating transmission of an indication toward a trace collection entity of whether packet duplication is enabled for the DRB. A method of operating a management node of a core network of a wireless communication system according to some embodiments includes transmitting a minimization of drive testing (MDT) configuration associated to a UE towards a network node, receiving an indication of whether packet duplication is enabled for a split DRB associated to the UE, and adjusting how throughput is calculated for the UE based on the indication.

17 Claims, 18 Drawing Sheets

(58) Field of Classification Search
USPC .......................................................... 455/423
See application file for complete search history.

(56) References Cited

OTHER PUBLICATIONS

Samsung, "Use case for Minimization of Drive Testing," R3-186104, 3GPP TSG-RAN WG3 #101bis, Chengdu, China, Oct. 8-12, 2018, 4 pages.
3GPP TR 36.805 V9.0.0, "3rd Generation Partnership Project; Technical Specification Group Radio Access Network; Study on Minimization of drive-tests in Next Generation Networks; (Release 9)," Dec. 2009, 24 pages.
3GPP TS 37.320 V15.0.0, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," Jun. 2018, 27 pages.
3GPP TS 28.552 V16.4.0, "3rd Generation Partnership Project; Technical Specification Group Services and System Aspects; Management and orchestration; 5G performance measurements (Release 16)," Dec. 2019, 159 pages.

PACKET DUPLICATION INDICATION FOR MDT

CROSS REFERENCE TO RELATED APPLICATIONS

This application is a 35 U.S.C. § 371 national stage application of PCT International Application No. PCT/SE2021/050035 filed on Jan. 21, 2021, which claims the benefit of U.S. Provisional Patent Application Ser. No. 62/976,267, filed on Feb. 13, 2020, the disclosures and content of which are incorporated by reference herein in their entireties.

BACKGROUND

Minimization of Drive Testing (MDT) is a feature of the Long Term Evolution (LTE) wireless communication systems that was developed to allow a network operator to obtain localized network quality measurements from user equipments (UEs) in the network. Traditionally, to obtain field data about network quality, operators would conduct a "drive test" in which a technician drives a testing vehicle around within a network coverage area and takes measurements of various network performance metrics (e.g. received power levels, interference levels, etc.) or UE performance (e.g, call drop frequency, throughput, handover performance, cell reselection performance, etc.) at various locations within the network coverage area. Performing such a drive test may be expensive and time consuming. MDT enables network operators to utilize users' equipment to collect radio measurements and associated location information to assess network performance, while reducing the costs associated with traditional drive tests.

MDT was initially studied in LTE Rel-9 (TR 36.805) with the purpose to minimize the actual drive tests. MDT has been introduced since Rel-10 in LTE. MDT has not been specified for NR in the involved standards in RAN2, RAN3 and SA5 groups.

The use cases in TR 36.805 include coverage optimization, mobility optimization, capacity optimization, parameterization for common channels and QoS verification.

Normal radio resource management (RRM) mechanisms only allow for measurements to be reported when the UE has an RRC connection with a particular cell, and there is sufficient UL coverage to transport the MEASUREMENT REPORT. This restricts measurements to be collected from UEs not experiencing radio link failure (RLF) and experiencing sufficient UL coverage. Moreover, there is no accompanying location information in normal RRM measurements.

When MDT was introduced in LTE Rel-10, it was decided to include MDT as a part of the Trace function which is able to provide very detailed logging data at call level. Based on the methods of activating/deactivating trace and trace configuration, the trace function can be classified into the following two aspects.

Management activation/deactivation: Trace Session is activated/deactivated in different Network Elements (NE) directly from the Element Manager (EM) using the management interfaces of those NEs.

Signalling Based Activation/Deactivation: Trace Session is activated/deactivated in different NEs using the signalling interfaces between those elements so that the NEs may forward the activation/deactivation originating from the EM.

MDT can be classified as Area-based MDT or Signalling-based MDT from the use case perspective illustrated below.

Area based MDT: MDT data is collected from UEs in a specified area. The area is defined as a list of cells (UTRAN or E-UTRAN) or as a list of tracking/routing/location areas. Area based MDT is an enhancement of the management-based trace functionality. Area based MDT can be either a logged MDT or Immediate MDT.

Signalling based MDT: MDT data is collected from one specific UE. The UE that is participating in the MDT data collection is specified as IMEI(SV) or as IMSI. Signalling based MDT is an enhancement of the signalling based subscriber and equipment trace. Signalling based MDT can be either a logged MDT or Immediate MDT.

In LTE, for Area based MDT, the MDT control and configuration parameters are sent by the Network Management function directly to the eNB. Then, the eNB selects UEs which fulfill the criteria including area scope and user consent and starts the MDT data collection. For signaling-based MDT, i.e., UE specific MDT, the MDT control and configuration parameters are sent by the Network Management to the mobility management entity (MME), which then forwards the parameters to eNB associated with the specific UE.

FIG. 1 summarizes the classification of the types of MDT.
Location Information

Logged MDT measurements are tagged by the UE with location data in the following manner. ECGI or Cell-Id of the serving cell when the measurement was taken is always included.

Detailed location information (e.g. GNSS location information) is included if available in the UE when the measurement was taken. If detailed location information is available, the reporting consists of latitude and longitude data associated with the measurements. Depending on availability, altitude, uncertainty and confidence may be also additionally included. The UE tags available detailed location information only once with upcoming measurement sample, and then the detailed location information is discarded. Thus, the validity of detailed location information is implicitly assumed to be one logging interval.

For Immediate MDT, the M1 measurements are tagged by the UE with location data in the following manner.

Detailed location information (e.g. GNSS location information) is included if available in the UE when the measurement was taken. If detailed location information is available, the reporting consists of latitude and longitude. Depending on availability, altitude, uncertainty and confidence may be also additionally included.

The UE should include the available detailed location information only once. If the detailed location information is obtained by GNSS positioning method, GNSS time information is included. For both event-based and periodic reporting, the detailed location information is included if the report is transmitted within the validity time after the detailed location information was obtained. The validity evaluation of detailed location information is left to UE implementation.

Citations are provided below for references that are mentioned in the present disclosure.
[1] 3GPP TS 28.552 V16.4.0
[2] 3GPP TS 37.320 V15.0.0

SUMMARY

A method of operating a radio access network (RAN) node includes determining whether packet duplication is activated for a split data radio bearer (DRB) associated to a user equipment, UE and initiating transmission of an indication toward a trace collection entity (TCE) of whether packet duplication is enabled for the DRB.

The method may further include receiving a minimization of drive testing (MDT) configuration for the UE, wherein the MDT configuration has an associated throughput measurement. Initiating transmission of the indication may be performed in response to receiving the MDT configuration.

The MDT configuration may be received from an Operations and Management (OAM) function in a 5G core network, wherein the TCE may be hosted by the OAM.

Initiating transmission of the indication may be performed periodically. In some embodiments, initiating transmission of the indication may be performed when the split DRB may be established.

The RAN node may include a master node with respect to the split DRB or a secondary node with respect to the split DRB. The split DRB may be split between a master node and a secondary node.

The indication may include a further indication of whether the DRB may be carrier aggregation based or dual connectivity based.

The RAN node may include a central unit (CU) of a lower layer split network node.

In some embodiments, the RAN node may include a user plane CU (CU-UP) that hosts a PDCP entity, and the method may further include receiving a configuration from a control plane CU (CU-UP) indicating that the CU-UP should initiate transmission of the indication toward the TCE of whether packet duplication may be enabled for the DRB.

In some embodiments, the RAN node may include a distributed unit (DU) of a lower layer split network node.

Determining whether packet duplication may be activated for the split DRB may include receiving a packet duplication status message from a CU of the lower layer split network node.

The MDT configuration may include an immediate MDT configuration.

A radio access network node configured to perform operations including determining whether packet duplication is activated for a split DRB associated to a user equipment, UE and initiating transmission of an indication toward a TCE of whether packet duplication is enabled for the DRB.

A RAN node according to some embodiments includes a processing circuit, and a memory coupled to the processing circuit. The memory includes computer readable program instructions that, when executed by the processing circuit, cause the RAN node to perform operations of determining whether packet duplication is activated for a split DRB associated to a UE and initiating transmission of an indication toward a trace collection entity, TCE, of whether packet duplication is enabled for the DRB.

A method of operating a management node of a core network of a wireless communication system according to some embodiments includes transmitting a MDT configuration associated to a UE towards a network node, receiving an indication of whether packet duplication is enabled for a split DRB associated to the UE, and adjusting how throughput is calculated for the UE based on the indication.

Adjusting how throughput is calculated for the UE based on the indication may include adding throughput measurements from a master node branch and a secondary node branch of the split DRB to obtain a total throughput measurement for the UE in response to an indication that packet duplication is not enabled for the split DRB.

Adjusting how throughput is calculated for the UE based on the indication may include selecting a higher throughput measurement from a master node branch and a secondary node branch of the split DRB to use as a throughput measurement for the UE in response to an indication that packet duplication is enabled for the split DRB.

Some embodiments provide a management node configured to perform operations including transmitting a MDT configuration associated to a UE towards a network node, receiving an indication of whether packet duplication is enabled for a split DRB associated to the UE, and adjusting how throughput is calculated for the UE based on the indication. The management node may include an OAM function.

A management node according to some embodiments includes a processing circuit, and a memory coupled to the processing circuit. The memory includes computer readable program instructions that, when executed by the processing circuit, cause the management node to perform operations of transmitting a MDT configuration associated to a UE towards a network node, receiving an indication of whether packet duplication is enabled for a split DRB associated to the UE, and adjusting how throughput is calculated for the UE based on the indication.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Dual Connectivity

Figure 1:
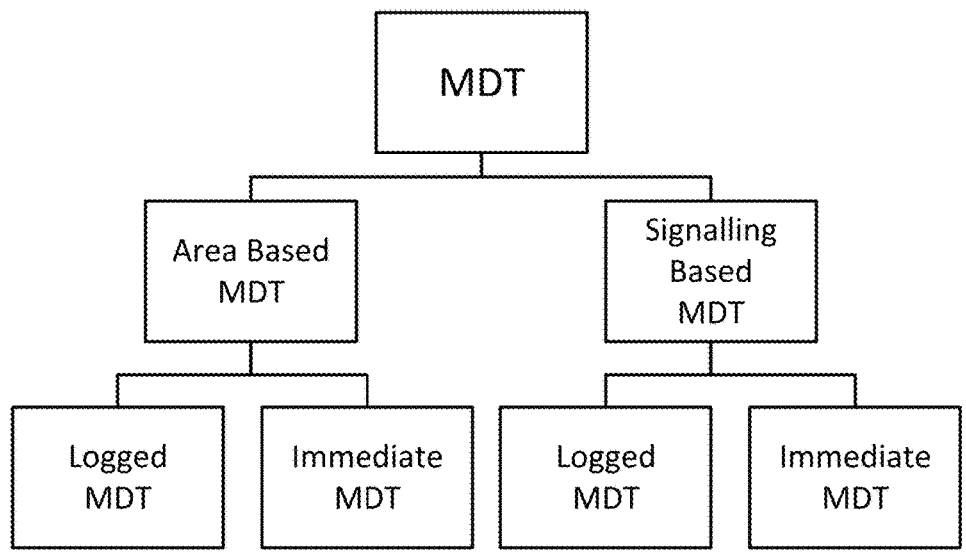
FIG. 1 is a block diagram that illustrates the classification of the types of MDT.
Figure 2:
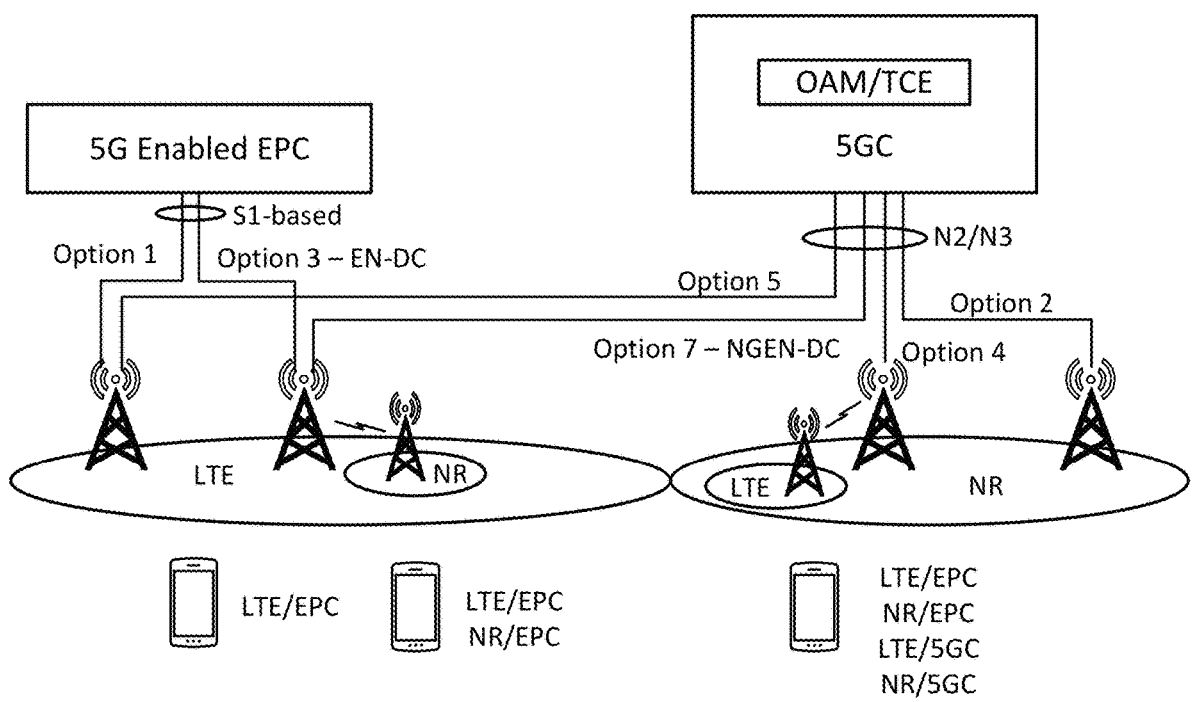
FIG. 2 is a block diagram that illustrates the multiple architecture options available for supporting Dual Connectivity in LTE-Rel 15 in which embodiments of the inventive concepts can be implemented.

FIG. 2 illustrates the multiple architecture options available for supporting Dual Connectivity in LTE-Rel 15. Currently, release 15 supports up to 7 architecture options, which includes both stand alone and non-stand alone scenarios.

Some embodiments described herein provide systems/methods for implementing MDT in various dual connectivity architectures. Accordingly, dual connectivity, and in particular multi-radio access technology (RAT) dual connectivity, or MR-DC, systems will be briefly discussed. In particular, the following scenarios will be discussed for MDT implementation Option 3: EN-DC, Option 4: NE-DC and Option 7: NGEN-DC.

As part of MR-DC configuration, each UE is configured with two separate scheduled cell groups, namely, a Master Cell Group (MCG) and a Secondary Cell Group (SCG). The Master Cell Group (MCG) belongs to the master node (MN) and the Secondary Cell Group belongs to the secondary node (SN). Based on the type of MR-DC in question, the MN and SN could either be LTE cells or NR cells.

Bearer Termination Options in MR-DC

Figure 3:
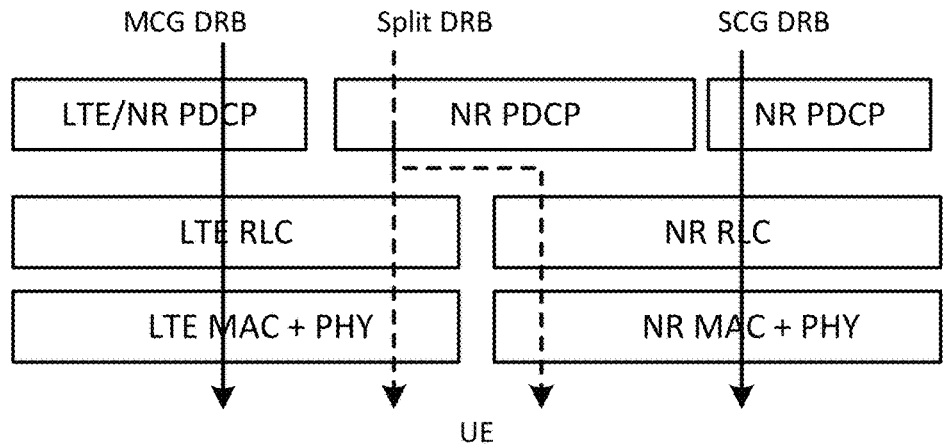
FIG. 3 illustrates bearer types based on termination points.

An important aspect to understand in MR-DC is the bearer termination. FIG. 3 illustrates the bearer types based on termination points. There are mainly two types of bearer termination in MR-DC, namely, MN terminated bearer and SN terminated bearer.

In MR-DC, an MN terminated bearer is a radio bearer for which PDCP is located in the MN.

In MR-DC, an SN terminated bearer is a radio bearer for which PDCP is located in the SN.

This is an important aspect since it would also decide how the network would configure the UE with MDT configuration in MR-DC scenarios.

MDT Support in MR-DC

When it comes to MDT support in dual connectivity scenarios, there are a few basic considerations, specifically: visibility of DC configuration to the Operations and Management (OAM) function and impact on MDT configuration, configuration of MDT to UE via MN, SN or both, and trigger type support in MDT for MR-DC.

Visibility of DC Configuration to the OAM and Impact on MDT Configuration

Activation of dual connectivity to a UE is need-based and configured by the RAN nodes on case by case and UE support basis. The OAM is aware about the support for dual connectivity in a specific RAN node, but the OAM does not have visibility about the dual connectivity configuration of an individual UE. So, to support MDT configuration with dual connectivity, the OAM needs to provide an MDT configuration including a configuration for secondary cell group (SCG) cells based on RAN support rather than support of the individual UE.

Configuration of MDT Configuration to UE Via MN, SN or Both

The next important aspect is how the MDT configuration with DC consideration is sent to the UE. Before assessing the configuration option for MDT in MR-DC scenarios, it is important to assess the measurement quantities currently available in MDT for both logged and immediate MDT as shown in Table 2 below.

Logged MDT only involves UE-specific measurements, but Immediate MDT involves measurements from both UE and the RAN node, specifically measurements M4-M7 are specific to RAN node.

Thus, specifically for Immediate MDT in MR-DC, there is a need to configure both RAN nodes that contribute towards calculating the MDT measurements.

Considering the options available to configure the MDT on UE in MR-DC scenarios, there are multiple options available.

In one approach, an MDT configuration may always be provided by the MN.

In another approach, an MDT configuration for the UE is provided by the MN, and the SN provides its respective configuration to the UE.

In yet another approach, a flexible approach is taken for MDT configuration in DC scenarios, where the SN can be configured to provide MDT configuration based on network preference.

The first option, namely, that the complete MDT configuration including dual connectivity aspect is always provided by MN, is the simplest approach since it avoids the complexity needed to coordinate between MN and SN on which node would configure the MDT configuration for the SN towards the UE. There are some potential issues in case of MN configuring reports for SN on UE including that the MN needs to provide MDT configuration for the SN, potentially on another RAT, such as in the NE-DC or EN-DC scenarios. The trigger conditions and the configuration parameters could be different in this case which needs to be supported by the MN.

In the case of SN terminated bearer, a signaling radio bearer (SRB) is terminated directly at the SN. In that case, the measurements M4-M7 (shown in Table 2 below) need to be specifically measured at the SN, since the PDCP for the SN is separate from the MN. If the SN always needs to report these measurements to the MN, it will involve extra overhead in MN-SN signaling and coordination. It might be applicable in a split bearer scenario that part of the M4-M7 measurements can be measured in the MN since the PDCP is located in MN. However, in that case there would need to be a separate implementation for both split bearers and SN terminated bearers.

The second and third options provide more flexibility in terms of MN and SN coordination and also covers the scenario of SN terminated bearer measurements. In this case, MN and SN can perform MDT measurements independently but at the cost of more complexity in terms of MN-SN coordination for MDT configuration and also sharing SN MDT reports with MN.

In a case in which only the MN provides configuration for both MN and SN, the MN needs to coordinate with the SN for collecting measurements M4-M7 in case of SN terminated bearers, while the MN would receive the measurements M1, M2, M3m M8 and M9 directly from the UE. This would entail extra complexity, since depending on whether it is split bearer or SN terminated bearer, the MN needs to collect different measurements from the SN and then merge it into measurements received for SN from UE.

As shown in FIG. 2, the Operations and Management (OAM) function is defined as a part of the 5GC core network. The OAM hosts a trace collection entity (TCE) which receives trace data, including MDT measurements, from the network.

Trigger Type Support in MDT for MR-DC

Another aspect to consider is the support for SN related measurements during logged measurements. A brief overview of the types of MDT based on RRC state will now be provided.

MDT Types Based on RRC States: Logged MDT and Immediate MDT

In general, there are two types of MDT measurement logging, i.e., Logged MDT and Immediate MDT.

Logged MDT

A UE is configured to perform periodic MDT logging during RRC_IDLE state after receiving the MDT configurations from the network. The UE shall report the DL pilot strength measurements (RSRP/RSRQ) together with time information, detailed location information if available, and WLAN, Bluetooth to the network using the UE information framework when it moves back to the RRC_CONNECTED state. The DL pilot strength measurement of Logged MDT is collected based on the existing measurements required for cell reselection purpose, without imposing UE to perform additional measurements. Measurement quantities for logged MDT are shown in Table 1.

TABLE 1

The measurement logging for Logged MDT

| MDT mode | RRC states | Measurement quantities |
|---|---|---|
| Logged MDT | RRC_IDLE | RSRP and RSRQ of the serving cell and available UE measurements for intra-frequency/inter-frequency/inter-RAT, time stamp and detailed location information if available. |

Immediate MDT

Measurements for Immediate MDT purpose can be performed by RAN and UE. There are a number of measurements (M1-M9 defined in [2]) which are specified for RAN measurements and UE measurements. For UE measurements, the MDT configuration is based on the existing RRC measurement procedures for configuration and reporting with some extensions for location information.

The measurement quantities for Immediate MDT are shown in Table 2.

TABLE 2

The measurement quantities for Immediate MDT

| MDT mode | RRC states | Measurement quantities |
|---|---|---|
| Immediate MDT | RRC_CONNECTED | M1: RSRP and RSRQ measurement by UE. |
| | | M2: Power Headroom measurement by UE. |
| | | M3: Received Interference Power measurement by eNB. |
| | | M4: Data Volume measurement separately for DL and UL, per QCI per UE, by eNB. |
| | | M5: Scheduled IP Throughput for MDT measurement separately for DL and UL, per RAB per UE and per UE for the DL, per UE for the UL, by eNB. |
| | | M6: Packet Delay measurement, separately for DL and UL, per QCI per UE, see UL PDCP Delay, by the UE, and Packet Delay in the DL per QCI, by the eNB. |
| | | M7: Packet Loss rate measurement, separately for DL and UL per QCI per UE, by the eNB. |
| | | M8: RSSI measurement by UE. |
| | | M9: RTT measurement by UE. |

In NR, the throughput measurement that has been agreed to be used for immediate MDT procedures is the RLC throughput metric. In particular, it has been agreed that for SA case, the DL/UL throughput measurement in the RLC entity in SA5 would be reused. The definition of the throughput measurement is captured in the SA5 specification [1] related to performance monitoring. This measurement is performed per UE level when the immediate MDT configuration requests the RAN node to perform throughput measurement (MS measurement). This measurement is performed by the CellDU and the definition of the measurement (for DL based measurement) is based on the RLC level data volume delivered to the UE successfully from either the primary or the supplementary aggregated carriers (in the carrier aggregation mode) in a given time duration.

Sec. 5.1.1.3.1 of [1] specifies that throughput measurements are calculated as follows:

Average DL UE Throughput in gNB a) This measurement provides the average UE throughput in downlink. This measurement is intended for data bursts that are large enough to require transmissions to be split across multiple slots. The UE data volume refers to the total volume scheduled for each UE regardless if using only primary—or also supplemental aggregated carriers. The measurement is optionally split into subcounters per QoS level (mapped 5QI or QCI in NR option 3) and subcounters per supported S-NSSAI.

b) DER (N=1)

c) This measurement is obtained according to the following formula based on the "ThpVolDl" and "ThpTimeDl" defined below. Separate counters are maintained for each mapped 5QI (or QCI for option 3) and for each supported S-NSSAI.

$$\text{If } \sum_{UEs}\sum ThpTimeDl > 0, \frac{\sum_{UEs}\sum ThpVolDl}{\sum_{UEs}\sum ThpTimeDl} \times 1000 \text{ [kbit/s]}$$

If $\sum_{UEs}\sum ThpTimeDl=0$, 0 [kbit/s]

For small data bursts, where all buffered data is included in one initial HARQ transmission, ThpTimeDl=0, otherwise ThpTimeDl=$T1-T2$ [ms]

| | |
|---|---|
| ThpTimeDl | The time to transmit a data burst excluding the data transmitted in the slot when the buffer is emptied. A sample of "ThpTimeDl" for each time the DL buffer for one DataRadioBearer (DRB) is emptied. |
| T1 | The point in time after T2 when data up until the second last piece of data in the transmitted data burst which emptied the RLC SDU available for transmission for the particular DRB was successfully transmitted, as acknowledged by the UE. |
| T2 | The point in time when the first transmission begins after a RLC SDU becomes available for transmission, where previously no RLC SDUs were available for transmission for the particular DRB. |
| ThpVolDl | The RLC level volume of a data burst, excluding the data transmitted in the slot when the buffer is emptied. A sample for ThpVolDl is the data volume, counted on RLC SDU level, in kbit successfully transmitted (acknowledged by UE) in DL for one DRB during a sample of ThpTimeDl. (It shall exclude the volume of the last piece of data emptying the buffer). | d) Each measurement is a real value representing the throughput in kbit per second. The number of measurements is equal to one. If the optional QoS level subcounter and S-NSSAI subcounter measurements are performed, the number of measurements is equal to the number of mapped 5QIs and the number of supported S-NSSAIs.

e) The measurement name has the form DRB.UEThpDl, or optionally DRB.UEThpDl.QOS, where QOS identifies the target quality of service class, and DRB.UEThpDl.SNSSAI, where SNSSAI identifies the S-NSSAI . . .

f) NRCellDU g) Valid for packet switched traffic h) 5GS i) One usage of this measurement is for performance assurance within integrity area (user plane connection quality).

FIG. 3 illustrates a split bearer case of MR-DC. In the example shown in FIG. 3, a DRB is split at the PDCP layer of a NR node. One branch of the split bearer is carried through the RLC and MAC/PHY layers of an LTE MN, while the other branch is carried through the RLC and MAC/PHY layers of an NR SN. In the split bearer case shown in FIG. 3, when duplication is configured, the NR PDCP will duplicate the packets and send them to the UE via both MN and SN (as shown in broken lines in FIG. 3).

Figure 4:
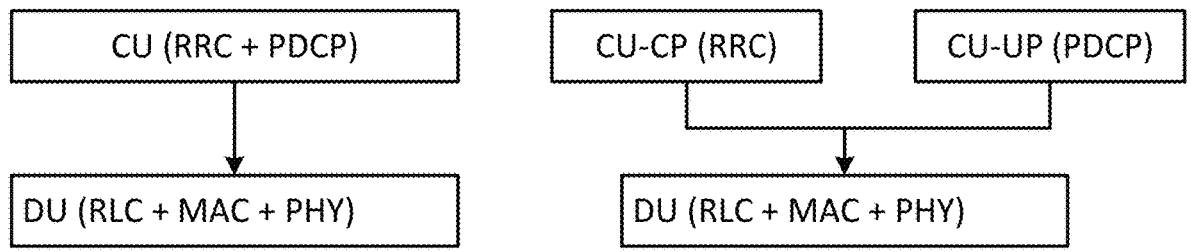
FIG. 4 illustrates various topologies of lower-layer split network nodes.

FIG. 4 illustrates various topologies of a lower-layer split architecture. In particular, a RAN node may be functionally split into a central unit (CU), a distributed unit (DU) and a radio unit (RU). In one case, the CU may host both control plane (RRC) and user plane (PDCP) entities, while the DU hosts RLC, MAC and PHY entities. The CU may be further split into a control plane part CU-CP that hosts RRC entities and a user plane part CU-UP that hosts PDCP entities.

Referring again to FIG. 3, the throughput measurement performed on the MN RLC layer and the throughput measurement performed on the SN RLC layer could differ, for example, due to the available bandwidth and/or the load scenarios. If an immediate MDT session associated to throughput measurement in both MCG and SCG is activated for the UE by the OAM, then the DU associated to MN and the DU associated to the SN send the respective RLC throughput measurements to the TCE (Trace Collection Entity) in the OAM (FIG. 2). However, the TCE is unaware of whether PDCP duplication is enabled or disabled for the UE.

Some embodiments described herein provide systems/methods to report to TCE whether PDCP duplication is enabled or not for a given DRB associated to a UE when immediate MDT is configured for that UE.

Figure 5A:
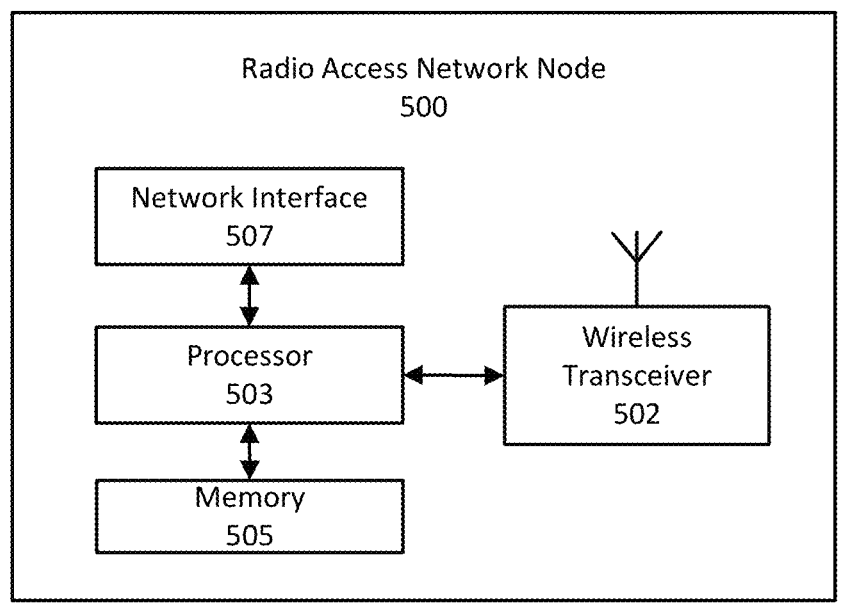
FIG. 5A is a block diagram illustrating a radio access network node according to some embodiments of the inventive concepts.

FIG. 5A is a block diagram illustrating elements of a radio access network node 500 of a communication system. For example, the network node 500 may implement a gNodeB or eNodeB.

As shown, the network node 500 may include a network interface circuit 507 (also referred to as a network interface) configured to provide communications with other nodes (e.g., with other base stations, RAN nodes and/or core network nodes) of the communication network. The network node 500 may also include a wireless transceiver circuit 502 for providing a wireless communication interface with UEs. The network node 500 may also include a processor circuit 503 (also referred to as a processor) coupled to the transceiver circuit 502 and the network interface 507, and a memory circuit 505 (also referred to as memory) coupled to the processor circuit. The memory circuit 505 may include computer readable program code that when executed by the processor circuit 503 causes the processor circuit to perform operations according to embodiments disclosed herein. According to other embodiments, processor circuit 503 may be defined to include memory so that a separate memory circuit is not required.

As discussed herein, operations of the network node may be performed by processor 503, the wireless transceiver circuit 502 and/or the network interface 507. For example, the processor 503 may control the network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processor 503, processor 503 performs respective operations (e.g., operations discussed herein with respect to Example Embodiments).

Figure 5B:
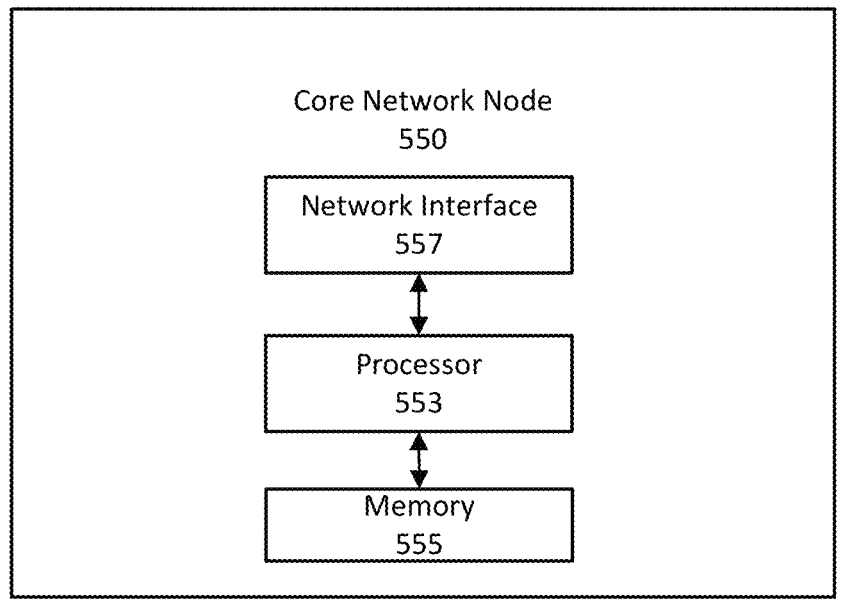
FIG. 5B is a block diagram illustrating a core network node according to some embodiments of the inventive concepts.

FIG. 5B is a block diagram illustrating elements of a core network node 550 of a communication system. As shown, the network node 550 may include a network interface circuit 557 (also referred to as a network interface) configured to provide communications with other nodes (e.g., with other base stations, RAN nodes and/or core network nodes) of the communication network. The network node 550 may also include a processor circuit 553 (also referred to as a processor) coupled to the transceiver circuit 552 and the network interface 557, and a memory circuit 555 (also referred to as memory) coupled to the processor circuit. The memory circuit 555 may include computer readable program code that when executed by the processor circuit 553 causes the processor circuit to perform operations according to embodiments disclosed herein. According to other embodiments, processor circuit 553 may be defined to include memory so that a separate memory circuit is not required.

As discussed herein, operations of the network node may be performed by processor 553 and/or the network interface 557. For example, the processor 553 may control the network interface 557 to transmit communications through network interface 557 to one or more other network nodes and/or to receive communications through network interface from one or more other network nodes. Moreover, modules may be stored in memory 555, and these modules may provide instructions so that when instructions of a module are executed by processor 553, processor 553 performs respective operations (e.g., operations discussed herein with respect to Example Embodiments).

Figure 6:
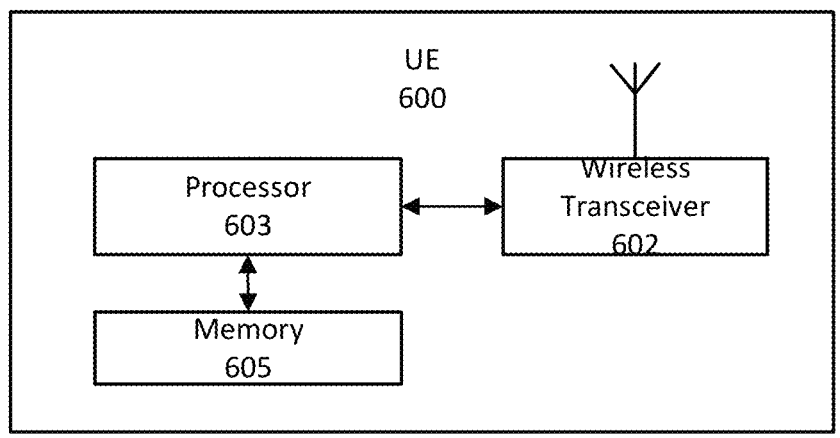
FIG. 6 is a block diagram illustrating a user equipment node according to some embodiments of the inventive concepts.

FIG. 6 is a block diagram illustrating elements of a UE 600 of a communication system. As shown, the UE may include a wireless transceiver circuit 602 for providing a wireless communication interface with a network. The UE 600 may also include a processor circuit 603 (also referred to as a processor) coupled to the transceiver circuit 602 and the wireless transceiver circuit 602, and a memory circuit 605 (also referred to as memory) coupled to the processor circuit. The memory circuit 605 may include computer readable program code that when executed by the processor circuit 603 causes the processor circuit to perform operations according to embodiments disclosed herein. According to other embodiments, processor circuit 603 may be defined to include memory so that a separate memory circuit is not required.

As discussed herein, operations of the UE may be performed by processor 603 and/or the wireless transceiver circuit 602. For example, the processor 603 may control the wireless transceiver circuit 602 to transmit communications to a network node 500. Moreover, modules may be stored in memory 605, and these modules may provide instructions so that when instructions of a module are executed by processor 603, processor 603 performs respective operations (e.g., operations discussed herein with respect to Example Embodiments).

Figure 7A:
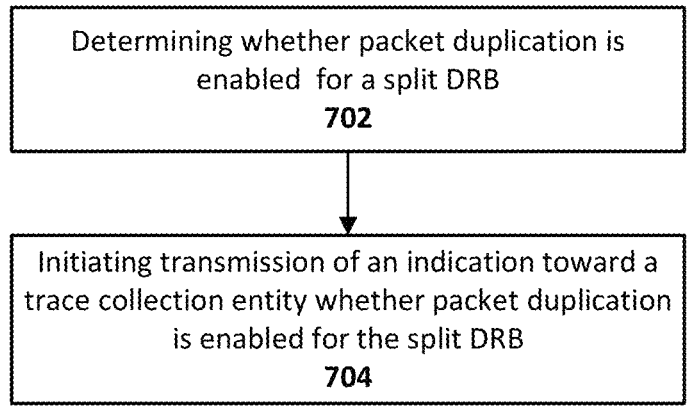
FIGS. 7A and 7B are flowcharts illustrating operations according to some embodiments of the inventive concepts.

Referring to FIG. 7A, a method of operating a radio access network (RAN) node 500 for implementing minimization of drive testing, MDT, in a wireless communication network that supports dual connectivity and/or carrier aggregation according to some embodiments is provided. The method includes determining (block 702) whether packet duplication is activated for a split data radio bearer, DRB, and initiating (block 704) transmission of an indication toward a trace collection entity, TCE, of whether packet duplication is enabled for the DRB. The OAM that manages the TCE may adjust how it determines a throughput measurement of the DRB in response to whether or not packet duplication is enabled for the DRB.

Figure 7B:
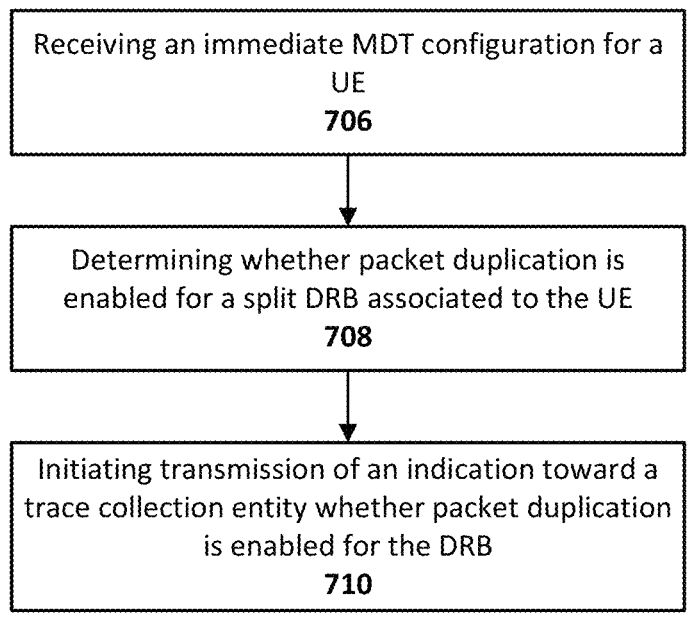

A method of operating a RAN node 500 according to further embodiments is illustrated in FIG. 7B. As shown therein, the method includes receiving an immediate MDT configuration for a user equipment (UE) (block 706), determining whether packet duplication is enabled for a split DRB associated with the UE (block 708) and initiating transmission of an indication toward a trace collection entity (TCE) of whether packet duplication is enabled for the DRB (block 710).

Based on the indication provided by the RAN node, the OAM that manages the TCE can estimate the perceived application level UE throughput in a more accurate way. For example, if the packet duplication indication is false, the OAM can add up the throughputs from a MN branch and a SN branch of the split DRB. If the packet duplication indication is true (i.e., packet duplication is enabled for the DRB), the OAM selects a larger throughput from the MN branchy and the SN branch as the throughput associated with the split DRB.

Figure 8:
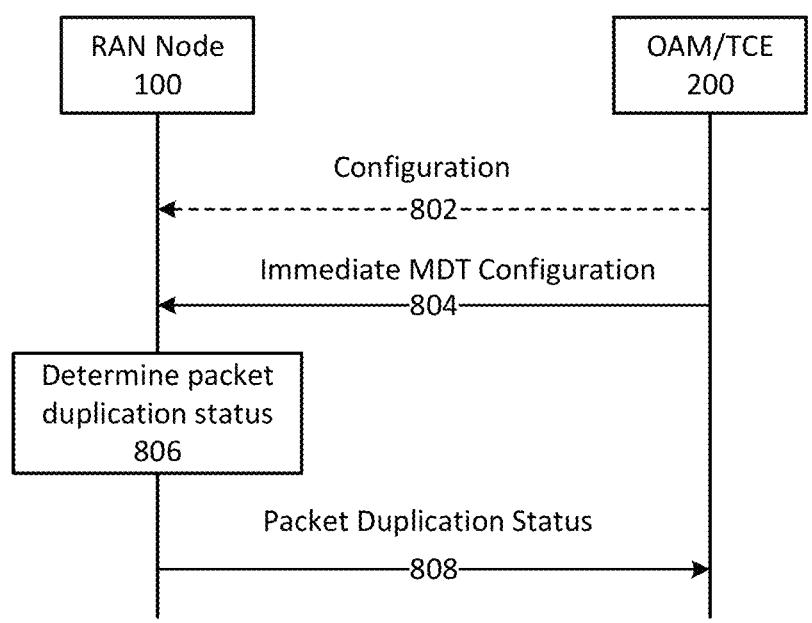
FIGS. 8, 9A, 9B, 10A, and 10B are flow diagrams illustrating operations according to some embodiments of the inventive concepts.

Referring to FIG. 8, in some embodiments, a RAN node 100 receives an optional configuration message 802 from an OAM 200 informing the RAN node 100 of the need to send the indication about the DC based DL packet duplication status to the TCE. The RAN node 100 then receives an immediate MDT configuration 804 associated to a DRB. The RAN node 100 determines the packet duplication status of the DRB (block 806) and transmits the packet duplication status toward the TCE in the OAM 200.

In some embodiments, the RAN node is a CU-CP (the network node that houses RRC entity). In some other embodiments, the RAN node is a CU-UP (the network node that houses PDCP entity). In such embodiments, the CU-UP may be informed of the need to send the indication about the DC based DL packet duplication status to the TCE from either the OAM (e.g., in management based immediate MDT configuration) or from the CU-CP (via E1 interface for signaling or management based immediate MDT configuration).

Figure 9A:
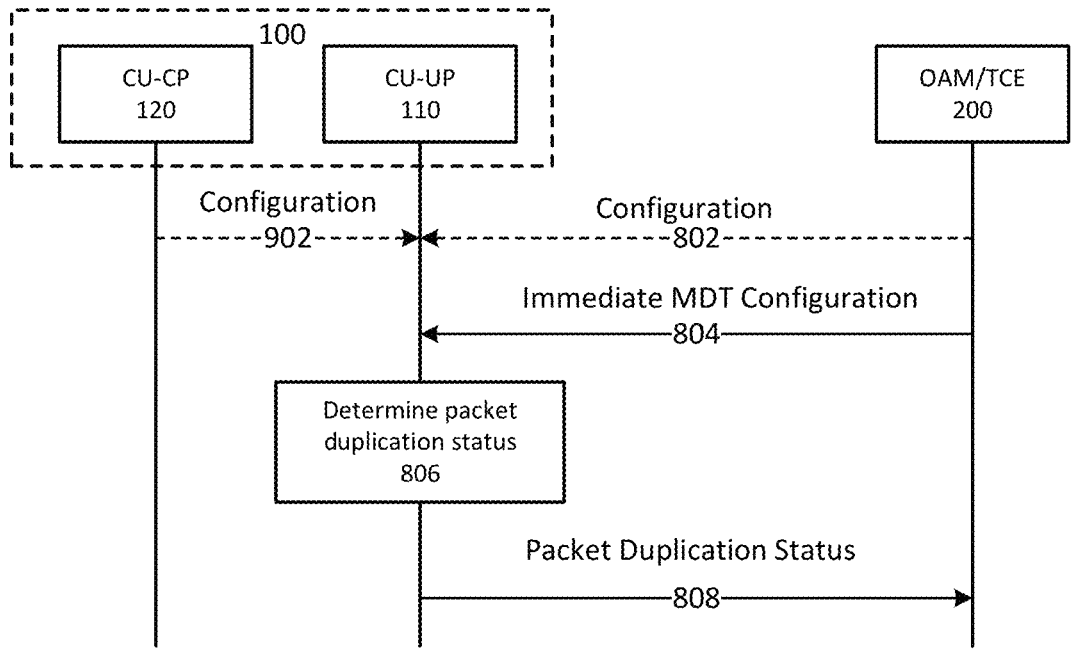

For example, referring to FIG. 9A, a CU-UP 110 may receive an optional configuration message 802 from an OAM 200 or an optional configuration message 902 from a CU-CP 120 informing the CU-UP 110 of the need to send the indication about the DC based DL packet duplication status to the TCE. The CU-UP 110 then receives an immediate MDT configuration 804 associated to a DRB from the OAM 200. The CU-UP 110 determines the packet duplication status of the DRB (block 806) and transmits the packet duplication status toward the TCE in the OAM 200.

In yet other embodiments, the RAN node is a DU (the network node that hosts RLC and MAC entities). In those embodiments, the DU may learn about the status of DC based DL packet duplication for the DRB from either the CU-CP (i.e., via F1-C interface) or the CU-UP (i.e., via F1-C interface).

Figure 10A:
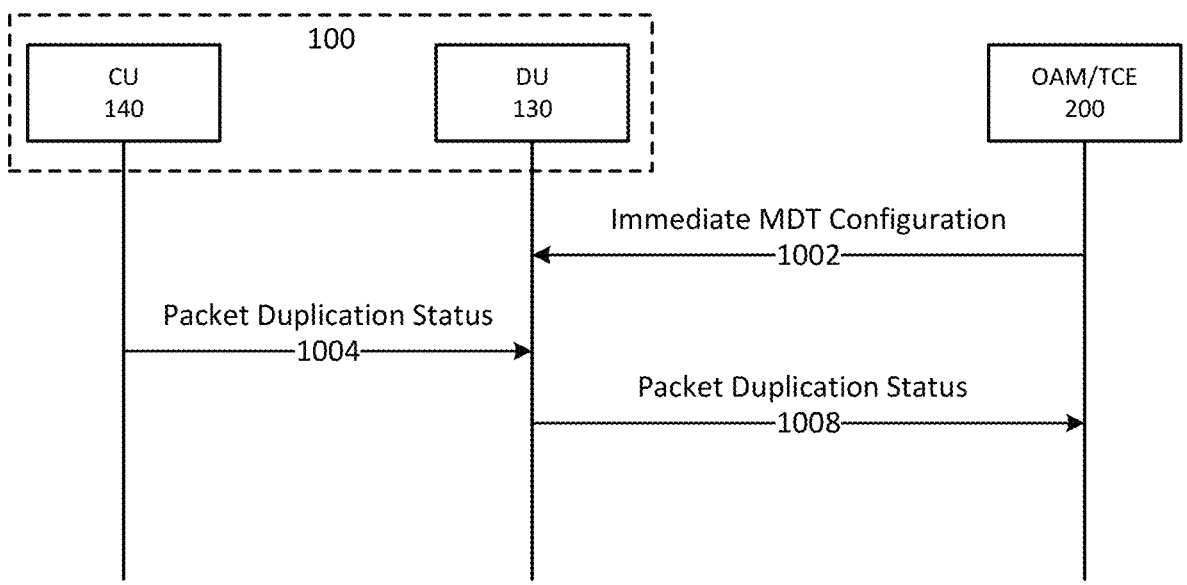

For example, referring to FIG. 10A, a DU 130 receives an immediate MDT configuration 1002 associated to a DRB from an OAM 200. The DU 130 obtains the packet duplication status of the DRB from the CU 140 in a message 1004 and transmits the packet duplication status towards the TCE in the OAM 200 in a message 1008.

Figure 9B:
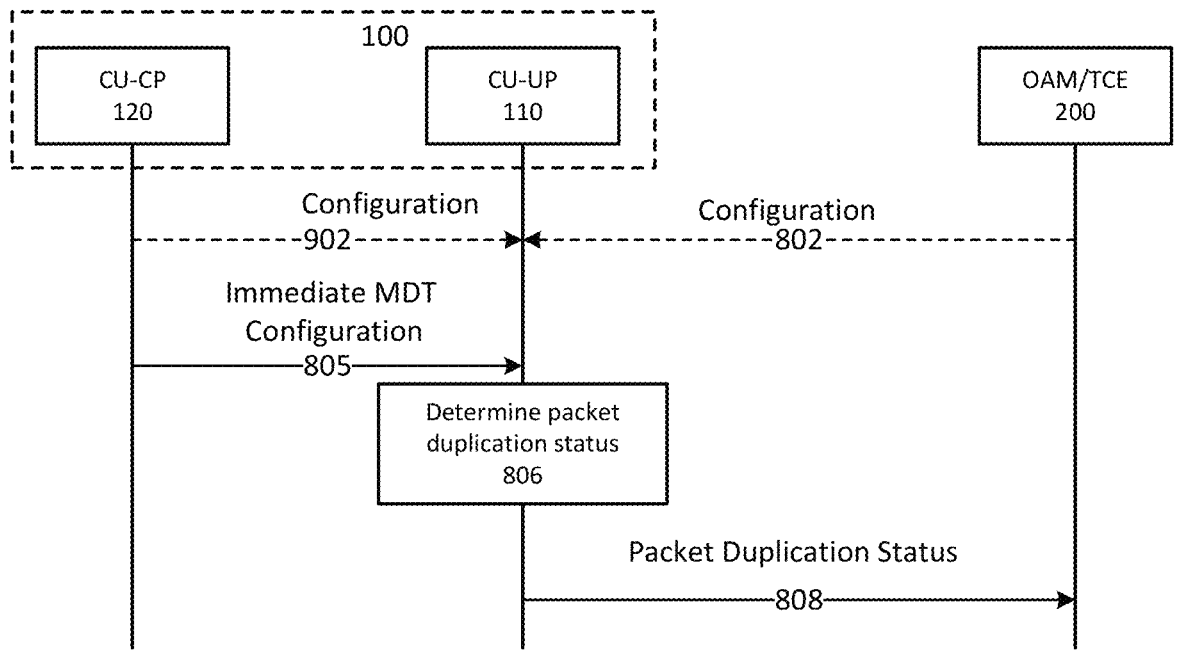
Figure 10B:
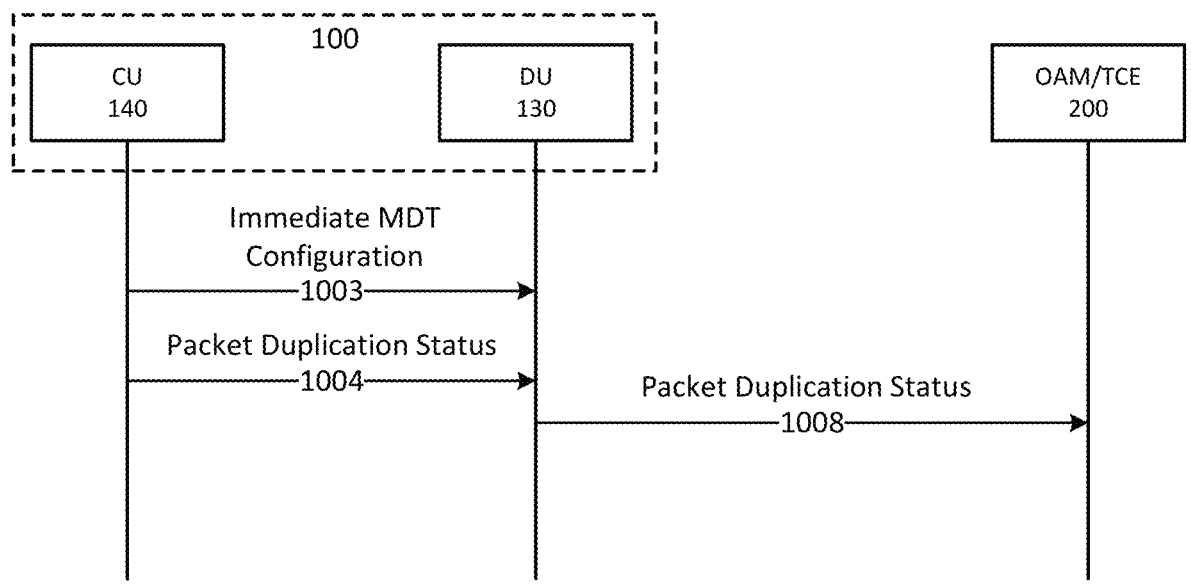

The operations illustrated in FIGS. 9A and 10A provide an example implementation for management based MDT; similar implementations for signaling based MDT are not precluded. For example, FIGS. 9B and 10B are similar to FIGS. 9A and 10A, except that in FIG. 9B, the immediate MDT configuration is provided to the CU-UP 110 by the CU-CP 120 in a message 805, and in FIG. 10B, the immediate MDT configuration is provided to the DU 130 by the CU 140 in a message 1003.

In some embodiments, the RAN node 100 (or CU or DU) may send an indication regarding whether packet duplication is enabled or not every time the status of the associated DC-based DL packet duplication changes. That is, every time the status changes, the TCE will receive an update as to the current status of the DRB. Moreover, the status of packet duplication for a DRB may not be sent in response to receiving an MDT configuration in some embodiments In some other embodiments, the RAN node 100 may only send one indication regarding whether DC-based DL packet duplication is enabled or not for a DRB during the entire life time of the DRB.

In yet other embodiments, the RAN node 100 may send the indication regarding whether DC-based DL packet duplication is enabled or not for the DRB at regular periodic intervals.

In some embodiments, only the master node (MN) may indicate to the TCE about the status of the DC based DL packet duplication. In other embodiments, only the secondary node (SN) may indicate to the TCE about the status of the DC based DL packet duplication. In yet other embodiments, both the master node (MN) and the secondary node (SN) may indicate to the TCE about the status of the DC based DL packet duplication.

In the foregoing description, the status of DC based DL packet duplication is indicated to the TCE. It will be appreciated that a similar indication can be made with respect to carrier aggregation (CA) based DL packet duplication status.

Similarly, in the examples described above, although downlink (DL) based packet duplication is indicated to the TCE, it will be appreciated that a similar indication can be made for uplink (UL) based packet duplication.

In some embodiments, an indication can be provided to the TCE as to whether a DRB is a split DRB or a direct DRB, and if it is a split DRB, then there can be further indication as to whether packet duplication is enabled or not for the DRB. If packet duplication is enabled, then there can be a further indication as to whether the duplication is CA-based duplication or DC-based duplication.

Figure 11:
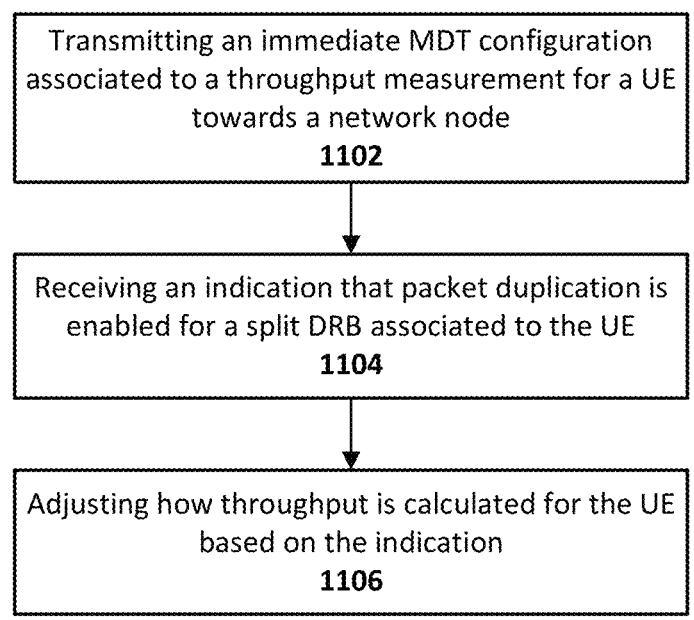
FIG. 11 is a flowchart illustrating operations according to some embodiments of the inventive concepts.

FIG. 11 illustrates operations of a management node, such as a core network node 500 that hosts an OAM function 200. Referring to FIG. 11, a method of operating a management node 500 of a core network of a wireless communication system includes transmitting (block 1102) a minimization of drive testing, MDT, configuration towards a network node, wherein the MDT configuration is associated to a user equipment, UE. The method further includes receiving (block 1104) an indication of whether packet duplication is enabled for a split data radio bearer, DRB, associated to the UE, and adjusting (block 1106) how throughput is calculated for the UE based on the indication.

In some embodiments, adjusting how throughput is calculated for the UE based on the indication includes adding throughput measurements from a master node branch and a secondary node branch of the split DRB to obtain a total throughput measurement for the UE in response to an indication that packet duplication is not enabled for the split DRB.

In some embodiments, adjusting how throughput is calculated for the UE based on the indication comprises selecting a higher throughput measurement from a master node branch and a secondary node branch of the split DRB to use as a throughput measurement for the UE in response to an indication that packet duplication is enabled for the split DRB.

EXAMPLE EMBODIMENTS

Embodiment 1. A method of operating a radio access network (RAN) node (500), comprising:
determining (702) whether packet duplication is activated for a split data radio bearer, DRB, associated to a user equipment, UE and
initiating (704) transmission of an indication toward a trace collection entity, TCE, of whether packet duplication is enabled for the DRB.

Embodiment 2. The method of Embodiment 1, further comprising:
receiving (706) a minimization of drive testing, MDT, configuration for the UE, wherein the MDT configuration has an associated throughput measurement;
wherein initiating transmission of the indication is performed in response to receiving the MDT configuration.

Embodiment 3. The method of Embodiment 2, wherein the MDT configuration is received from an Operations and Management (OAM) function in a 5G core network, wherein the TCE is hosted by the OAM.

Embodiment 4. The method of Embodiment 1, wherein initiating transmission of the indication is performed periodically.

Embodiment 5. The method of Embodiment 1, wherein initiating transmission of the indication is performed when the split DRB is established.

Embodiment 6. The method of any of Embodiments 1 to 5, wherein RAN node comprises a master node with respect to the split DRB.

Embodiment 7. The method of any of Embodiments 1 to 5, wherein RAN node comprises a secondary node with respect to the split DRB.

Embodiment 8. The method of any of Embodiments 1 to 7, wherein the split DRB is split between a master node and a secondary node.

Embodiment 9. The method of any of Embodiments 1 to 8, wherein the indication comprises a further indication of whether the DRB is carrier aggregation based or dual connectivity based.

Embodiment 10. The method of any of Embodiments 1 to 8, wherein the RAN node comprises a central unit, CU, of a lower layer split network node.

Embodiment 11. The method of Embodiment 10, wherein the RAN node comprises a user plane CU, CU-UP, that hosts a PDCP entity, the method further comprising receiving a configuration (902) from a control plane CU, CU-UP, indicating that the CU-UP should initiate transmission of the indication toward the TCE of whether packet duplication is enabled for the DRB.

Embodiment 12. The method of any of Embodiments 1 to 8, wherein the RAN node comprises a distributed unit, DU, of a lower layer split network node.

Embodiment 13. The method of Embodiment 12, wherein determining whether packet duplication is activated for the split DRB comprises receiving a packet duplication status message (1004) from a central unit, CU, of the lower layer split network node.

Embodiment 14. The method of any of Embodiments 1 to 12, wherein the MDT configuration comprises an immediate MDT configuration.

Embodiment 15. A radio access network node (500) configured to perform operations according to any of Embodiments 1 to 14.

Embodiment 16. A radio access network, RAN, node (500) comprising:
a processing circuit (503); and
a memory (505) coupled to the processing circuit, wherein the memory comprises computer readable program instructions that, when executed by the processing circuit, cause the RAN node to perform operations according to any of Embodiments 1 to 14.

Embodiment 17. A method of operating a management node (500) of a core network of a wireless communication system, comprising:
transmitting (1102) a minimization of drive testing, MDT, configuration towards a network node, wherein the MDT configuration is associated to a user equipment, UE;
receiving (1104) an indication of whether packet duplication is enabled for a split data radio bearer, DRB, associated to the UE; and
adjusting (1106) how throughput is calculated for the UE based on the indication.

Embodiment 18. The method of Embodiment 17, wherein adjusting how throughput is calculated for the UE based on the indication comprises adding throughput measurements from a master node branch and a secondary node branch of the split DRB to obtain a total throughput measurement for the UE in response to an indication that packet duplication is not enabled for the split DRB.

Embodiment 19. The method of Embodiment 17, wherein adjusting how throughput is calculated for the UE based on the indication comprises selecting a higher throughput measurement from a master node branch and a secondary node branch of the split DRB to use as a throughput measurement for the UE in response to an indication that packet duplication is enabled for the split DRB.

Embodiment 20. The method of any of Embodiments 17 to 19, wherein the management node comprises an Operations and Management (OAM) function.

Embodiment 21. A management node (500) configured to perform operations according to any of Embodiments 17 to 20.

Embodiment 22. A management node (500) comprising:
a processing circuit (503); and
a memory (505) coupled to the processing circuit, wherein the memory comprises computer readable program instructions that, when executed by the processing circuit, cause the management node to perform operations according to any of Embodiments 17 to 20.

Explanations are provided below for abbreviations that are mentioned in the present disclosure.

Abbreviation Explanation

CA Carrier aggregation
CP Control plane
CU Centralized Unit
CU-CP Centralized unit control plane
CU-UP Centralized unit user plane
DC Dual Connectivity
DL Downlink
DRB Data Radio Bearer
DU Distributed Unit
MDT Minimization of drive test
MN Master node
NR New Radio
OAM Operations and Management
PDCP Packet Data convergence protocol
SN Secondary node
TCE Trace collection entity
UL Uplink
UP User plane Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 12:
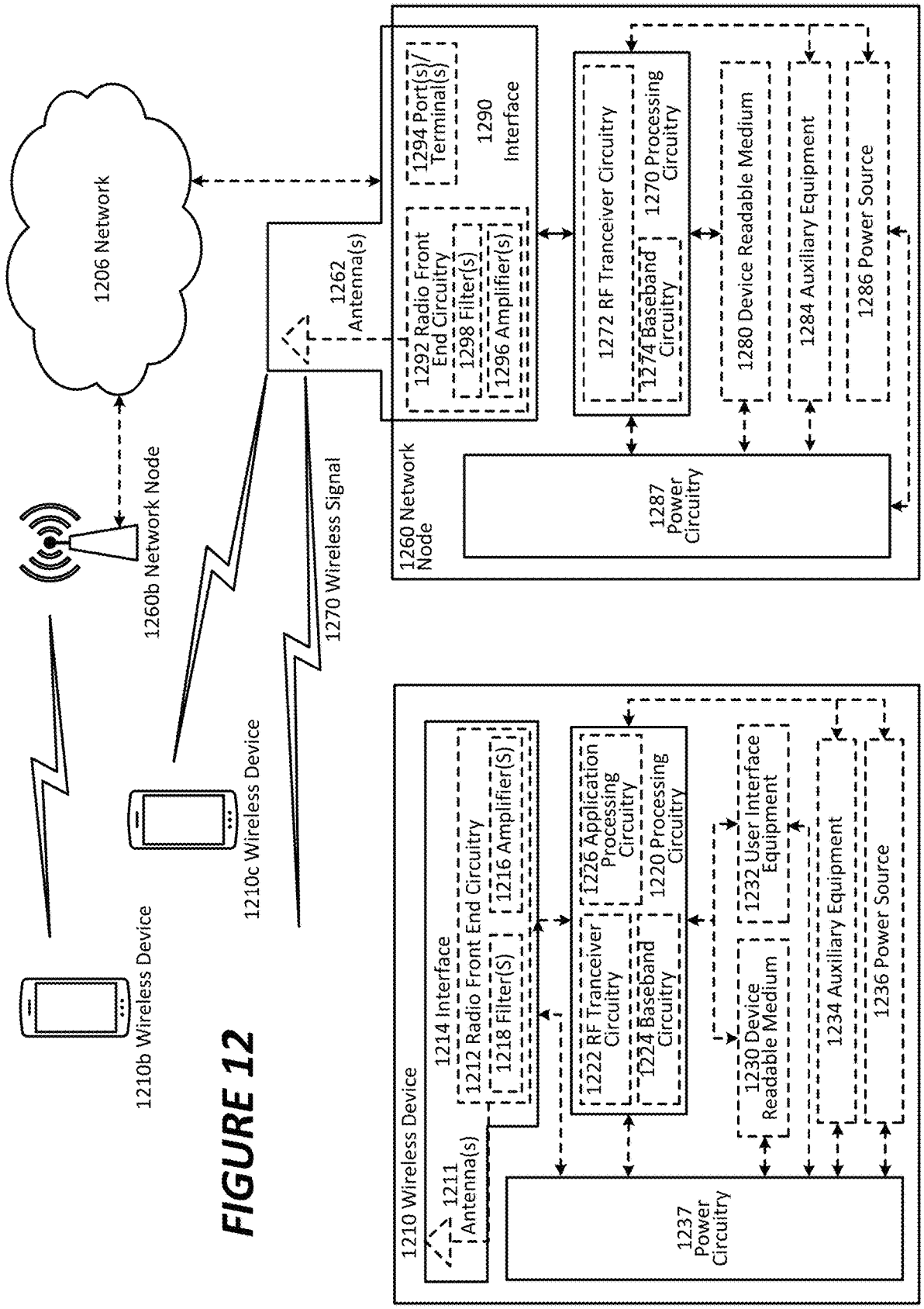
FIG. 12 is a block diagram of a wireless network in accordance with some embodiments.

FIG. 12: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1292 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1212 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated. User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
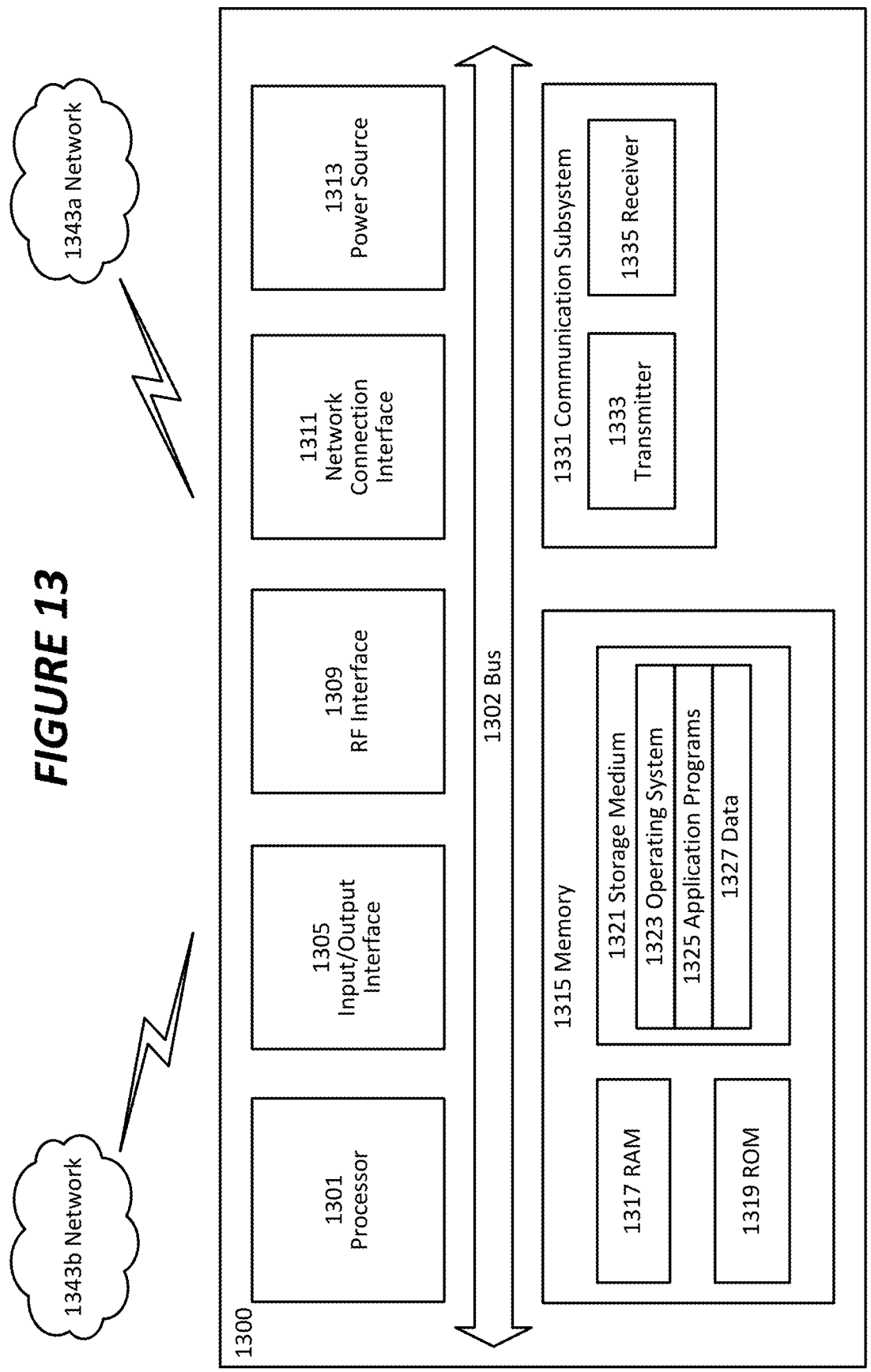
FIG. 13 is a block diagram of a user equipment in accordance with some embodiments

FIG. 13: User Equipment in accordance with some embodiments

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3rd Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1313, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343a. Network 1343a may encompass wired and/or wireless networks such as a local-area network (LAN), a wide-area network (WAN), a computer network, a wireless network, a telecommunications network, another like network or any combination thereof. For example, network 1343a may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
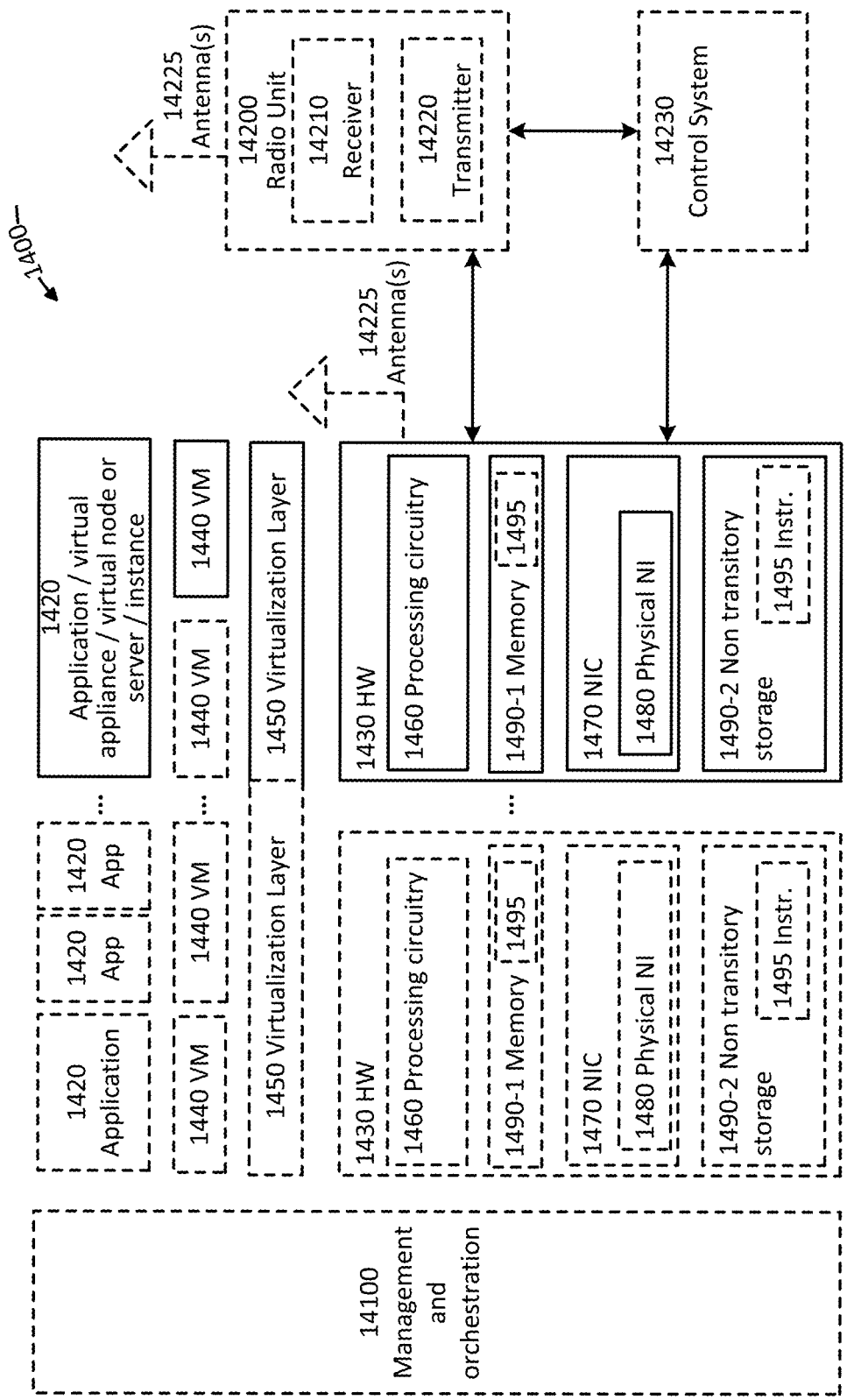
FIG. 14 is a block diagram of a virtualization environment in accordance with some embodiments.

FIG. 14: Virtualization environment in accordance with some embodiments

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which may include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
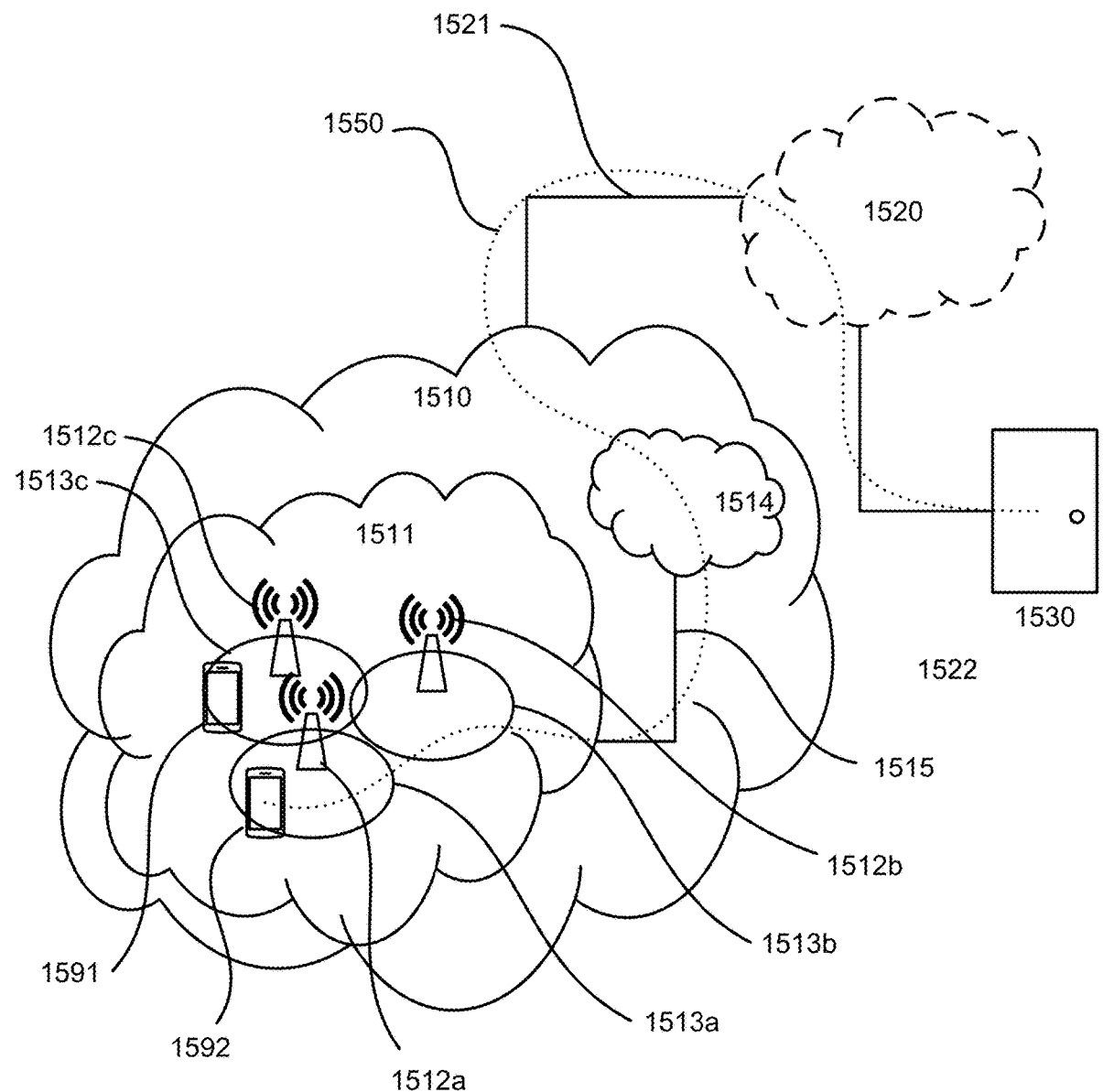
FIG. 15 is a block diagram of a telecommunication network connected via an intermediate network to a host computer in accordance with some embodiments.

FIG. 15: Telecommunication network connected via an intermediate network to a host computer in accordance with some embodiments.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
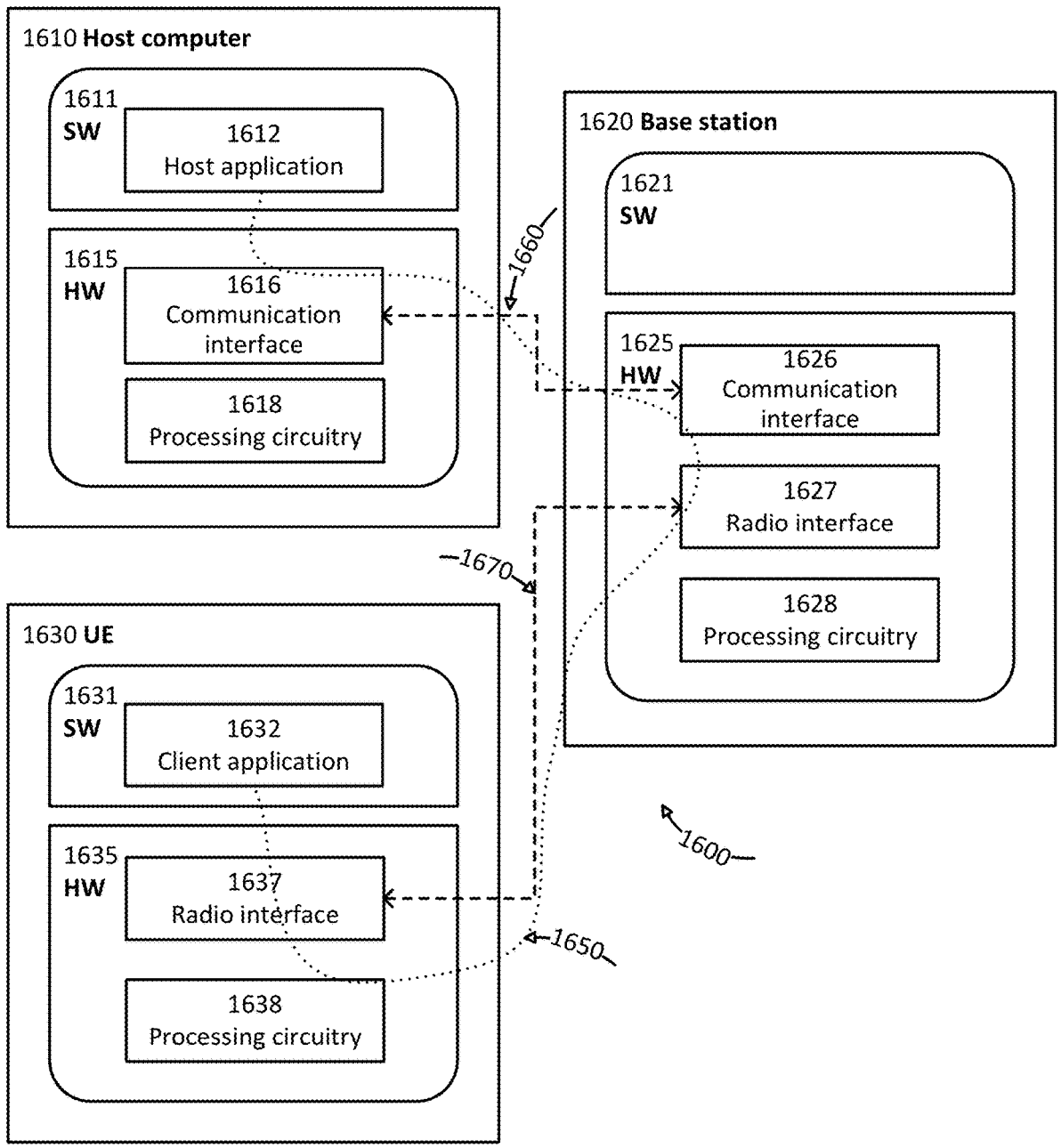
FIG. 16 is a block diagram of a host computer communicating via a base station with a user equipment over a partially wireless connection in accordance with some embodiments.

FIG. 16: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments may improve the performance of OTT services provided to UE 1630 using OTT connection 1650, in which wireless connection 1670 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
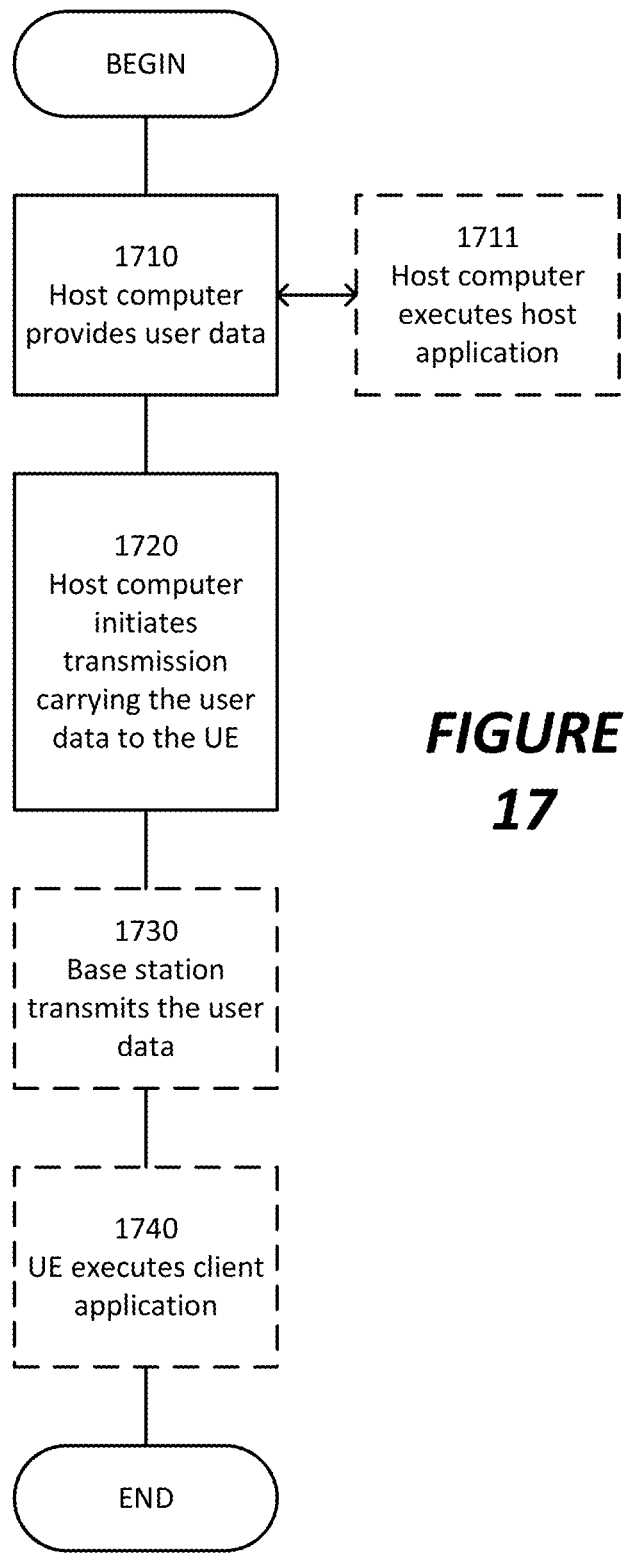
FIG. 17 is a block diagram of methods implemented in a communication system including a host computer, a base station, and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
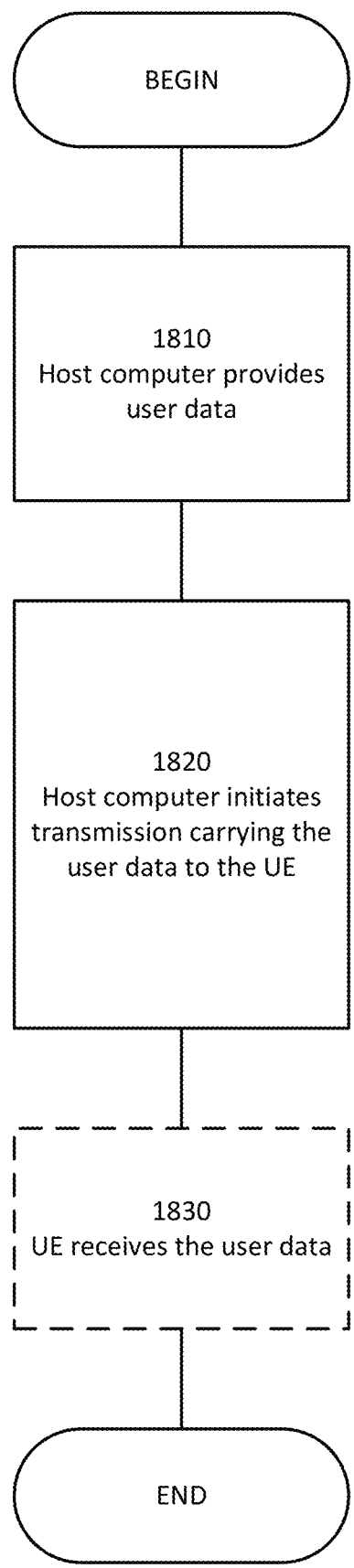
FIG. 18 is a block diagram of methods implemented in a communication system including a host computer, a base station, and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
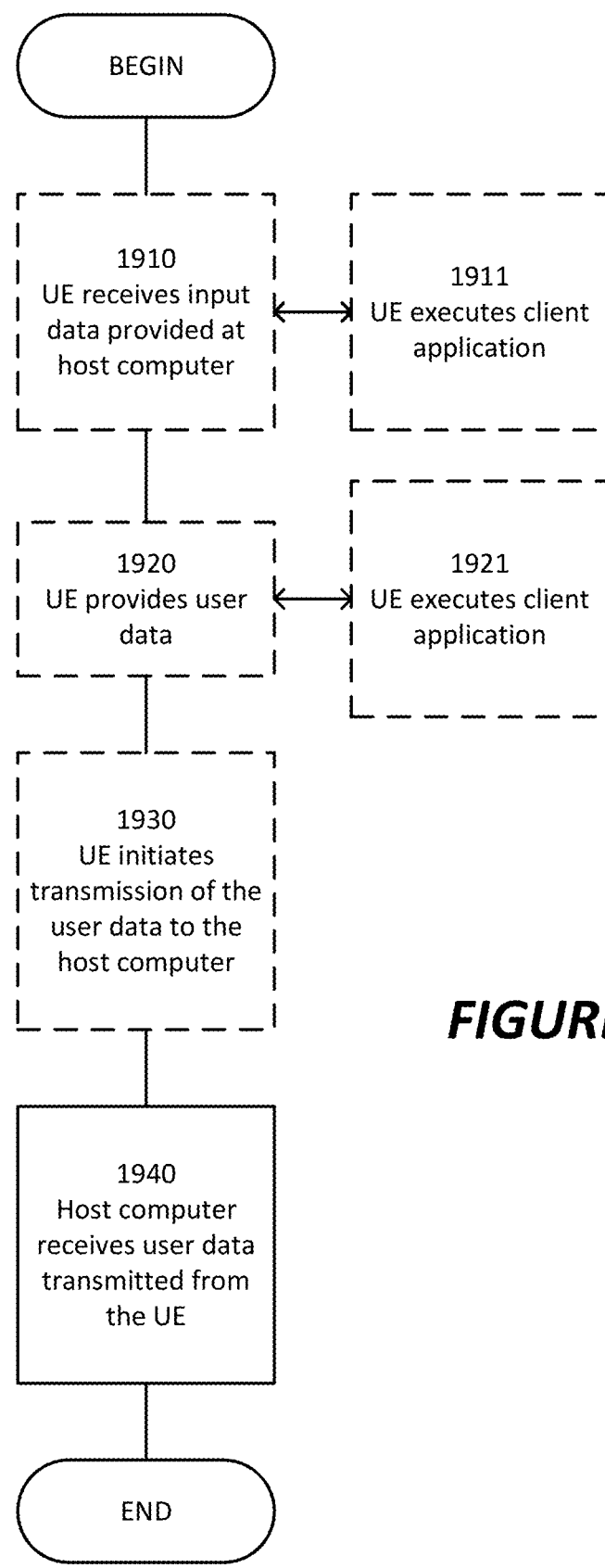
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
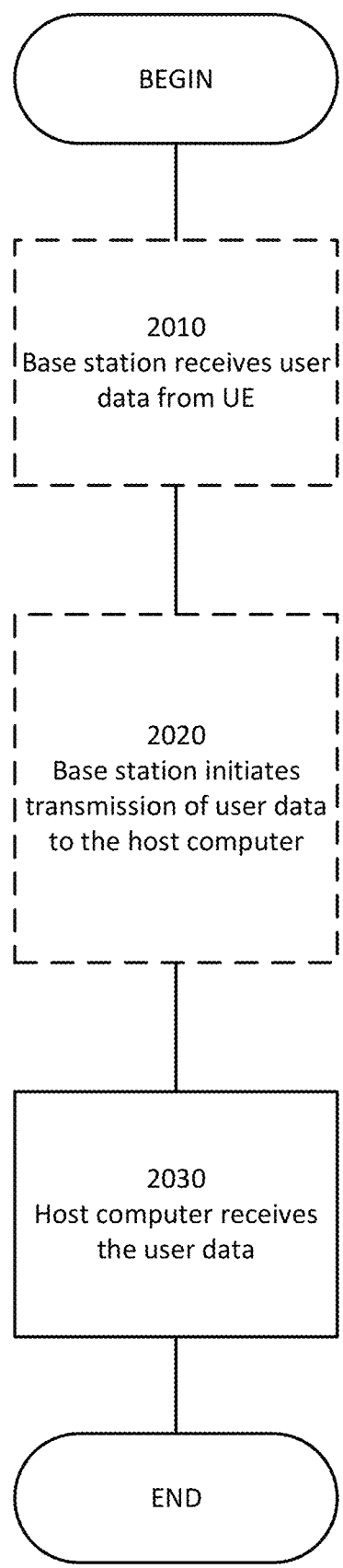
FIG. 20 is a block diagram of methods implemented in a communication system including a host computer, a base station, and a user equipment in accordance with some embodiments.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a radio access network, RAN, node, comprising:
   determining whether packet duplication is activated for a split data radio bearer, DRB, associated to a user equipment, UE and
   initiating transmission of an indication toward a trace collection entity, TCE, of whether packet duplication is enabled for the DRB.

2. The method of claim 1, further comprising:
   receiving a minimization of drive testing, MDT, configuration for the UE, wherein the MDT configuration has an associated throughput measurement;
   wherein initiating transmission of the indication is performed in response to receiving the MDT configuration.

3. The method of claim 2, wherein the MDT configuration is received from an Operations and Management, OAM, function in a 5G core network, wherein the TCE is hosted by the OAM.

4. The method of claim 1, wherein initiating transmission of the indication is performed periodically.

5. The method of claim 1, wherein initiating transmission of the indication is performed when the split DRB is established.

6. The method of any of claim 1, wherein the split DRB is split between a master node and a secondary node.

7. The method of claim 1, wherein the indication comprises a further indication of whether the DRB is carrier aggregation based or dual connectivity based.

8. The method of claim 1, wherein the RAN node comprises a central unit, CU, of a lower layer split network node.

9. The method of claim 8, wherein the RAN node comprises a user plane CU, CU-UP, that hosts a PDCP entity, the method further comprising receiving a configuration from a control plane CU, CU-UP, indicating that the CU-UP should initiate transmission of the indication toward the TCE of whether packet duplication is enabled for the DRB.

10. The method of claim 1, wherein the RAN node comprises a distributed unit, DU, of a lower layer split network node.

11. The method of claim 10, wherein determining whether packet duplication is activated for the split DRB comprises receiving a packet duplication status message from a central unit, CU, of the lower layer split network node.

12. The method of claim 1, wherein the MDT configuration comprises an immediate MDT configuration.

13. A radio access network node, configured to:
   determine whether packet duplication is activated for a split data radio bearer, DRB, associated to a user equipment, UE and
   initiate transmission of an indication toward a trace collection entity, TCE, of whether packet duplication is enabled for the DRB.

14. The radio access network node of claim 13, wherein the radio access network node is further configured to:
- receive a minimization of drive testing, MDT, configuration for the UE, wherein the MDT configuration has an associated throughput measurement;
- and to initiate transmission of the indication in response to receiving the MDT configuration.

15. The radio access network node of claim 14, wherein the MDT configuration is received from an Operations and Management, OAM, function in a 5G core network, wherein the TCE is hosted by the OAM.

16. A method of operating a management node of a core network of a wireless communication system, comprising:
- transmitting a minimization of drive testing, MDT, configuration towards a network node, wherein the MDT configuration is associated to a user equipment, UE;
- receiving an indication of whether packet duplication is enabled for a split data radio bearer, DRB, associated to the UE; and
- adjusting how throughput is calculated for the UE based on the indication.

17. A management node configured to:
- transmit a minimization of drive testing, MDT, configuration towards a network node, wherein the MDT configuration is associated to a user equipment, UE;
- receive an indication of whether packet duplication is enabled for a split data radio bearer, DRB, associated to the UE; and
- adjust how throughput is calculated for the UE based on the indication.

* * * * *